United States Patent
Neal et al.

(10) Patent No.: US 6,624,896 B1
(45) Date of Patent: Sep. 23, 2003

(54) SYSTEM AND METHOD FOR METROLOGY OF SURFACE FLATNESS AND SURFACE NANOTOPOLOGY OF MATERIALS

(75) Inventors: Daniel R. Neal, Tijeras, NM (US); Daniel R. Hamrick, Cedar Crest, NM (US); Thomas D. Raymond, Sandia Park, NM (US)

(73) Assignee: WaveFront Sciences, Inc., Albuquerque, NM (US)

( * ) Notice: Subject to any disclaimer, the term of this patent is extended or adjusted under 35 U.S.C. 154(b) by 150 days.

(21) Appl. No.: 09/690,766

(22) Filed: Oct. 18, 2000

Related U.S. Application Data
(60) Provisional application No. 60/159,641, filed on Oct. 18, 1999.

(51) Int. Cl.$^7$ ................................................ G01B 11/30
(52) U.S. Cl. ...................................... 356/600; 356/121
(58) Field of Search ................................ 356/600, 121; 250/201.9

(56) References Cited

U.S. PATENT DOCUMENTS

| | | | | |
|---|---|---|---|---|
| 4,141,652 A | * | 2/1979 | Feinleib | 250/201.9 |
| 5,333,049 A | * | 7/1994 | Ledger | 356/504 |
| 5,629,765 A | * | 5/1997 | Schmutz | 250/201.9 |
| 6,130,419 A | * | 10/2000 | Neal | 250/201.9 |
| 6,184,974 B1 | * | 2/2001 | Neal et al. | 250/201.9 |

* cited by examiner

*Primary Examiner*—Georgia Epps
*Assistant Examiner*—Richard Hanig
(74) *Attorney, Agent, or Firm*—Volentine Francos, PLLC

(57) ABSTRACT

A metrology system and method uses pulsed light to allow continuous movement of a target relative to the sensor. A metrology system and method uses dynamic adjustment of tilt in a system. A metrology system and method calibrates the system to remove inherent optical aberrations in the system. Filtering may also be used in the system to increase accuracy.

12 Claims, 6 Drawing Sheets

SYSTEM AND METHOD FOR METROLOGY OF SURFACE FLATNESS AND SURFACE NANOTOPOLOGY OF MATERIALS

CROSS-REFERENCES TO RELATED APPLICATIONS

The present application claims priority under 35 U.S.C. §119 to U.S. Provisional Application No. 60/159,641 filed on Oct. 18, 1999, the entire contents of which are hereby incorporated by reference for all purposes.

BACKGROUND OF THE INVENTION

1. Field of the Invention

The present invention is directed to a system and a method for metrology of surface flatness and surface nanotopology of materials.

2. Description of Related Art

Numerous methods of measuring metrology of a surface are known. A common method is interferometry, which uses a reference beam and a target beam and the resulting interference pattern formed between the beams to determine the metrology. Another method is Hartmann wavefront sensing which determines the metrology through slope measurement indicative of wavefront error.

Both of these methods have related problems, including how to increase throughput, how to compensate for aberrations inherent in the system, and how to dynamically remove systematic tilt from the systems.

SUMMARY OF THE INVENTION

The present invention is therefore directed to metrology systems and methods which substantially overcomes one or more of the problems due to the limitations and disadvantages of the related art.

It is an object of the present invention to remove tilt from the measurements. It is another object of the present invention to remove optical aberrations of the system from the measurements. It is yet another object of the present invention to protect the elements in the system from damage. It is further another object of the present invention to increase throughput. It is another object of the present invention to increase accuracy, both during measurements and/or calibration.

At least one of the above and other objects may be realized by providing a metrology system including a pulsed light source, a mechanical assembly positioning a target relative to the pulsed light source, a wavefront sensor detecting light from the target to determine metrology of the target, and an optical assembly directing light from the pulsed light source to the target and from the target to the wavefront sensor.

The pulsed light source may output infrared radiation or ultraviolet radiation. When ultraviolet radiation is used, the wavefront sensor may include a Lumogen coating. The system may include a power monitor for the pulsed light source which dynamically monitors and adjusts power output by the pulsed light source. The system may include a spatial filter which spatially filters light output from the pulsed light source. The pulsed light source may output non-coherent light. The system may include a translation stage which continuously translates the target relative to the wavefront sensor.

At least one of the above and other objects may be realized by providing a metrology method including calibrating a system for measuring metrology of a target with a reference, measuring the metrology of the target, and using the calibrating to remove optical aberrations of the system from the measuring.

The calibrating may be performed before each measuring. When the measuring includes a plurality of frames, the calibrating may be performed between at least one adjacent pair of the plurality of frames. The calibrating may include acquiring multiple frames.

At least one of the above and other objects may be realized by providing a metrology system including a light source, a mechanical assembly positioning a target relative to the light source, a wavefront sensor detecting light from the target to determine metrology of the target, an optical assembly directing light from the light source to the target and from the target to the wavefront sensor, and a dynamic range filter between the target and the wavefront sensor which prevents damage to the wavefront sensor.

The wavefront sensor may include a processor performing at least one of a stitching algorithm, a centroid algorithm, look-up tables, and data pipelining. The optical assembly delivering light to and from the target may be shielded from the wavefront sensor. The wavefront sensor may measure wavefronts from the target at different wavelengths.

At least one of the above and other objects may be realized by providing a metrology system including a light source, a mechanical assembly positioning a target relative to the light source, a wavefront sensor detecting light from the target to determine metrology of the target, and an optical assembly directing light from the light source to the target and from the target to the wavefront sensor. The optical assembly includes a position sensor which detects incoming tilt from the light source and an optical steering mirror which directs light onto the target, the position sensor controlling the optical steering mirror to dynamically remove tilt.

At least one of the above and other objects may be realized by providing a metrology method including positioning a target relative to incoming light, positioning a detector relative to the target, directing light from the light source to the target and from the target to the detector, detecting an incoming tilt from the incoming light, adjusting the directing of the incoming light onto the target in accordance with the incoming tilt, and determining metrology of the target from light received by the detector.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF PREFERRED EMBODIMENTS

Figure 1:
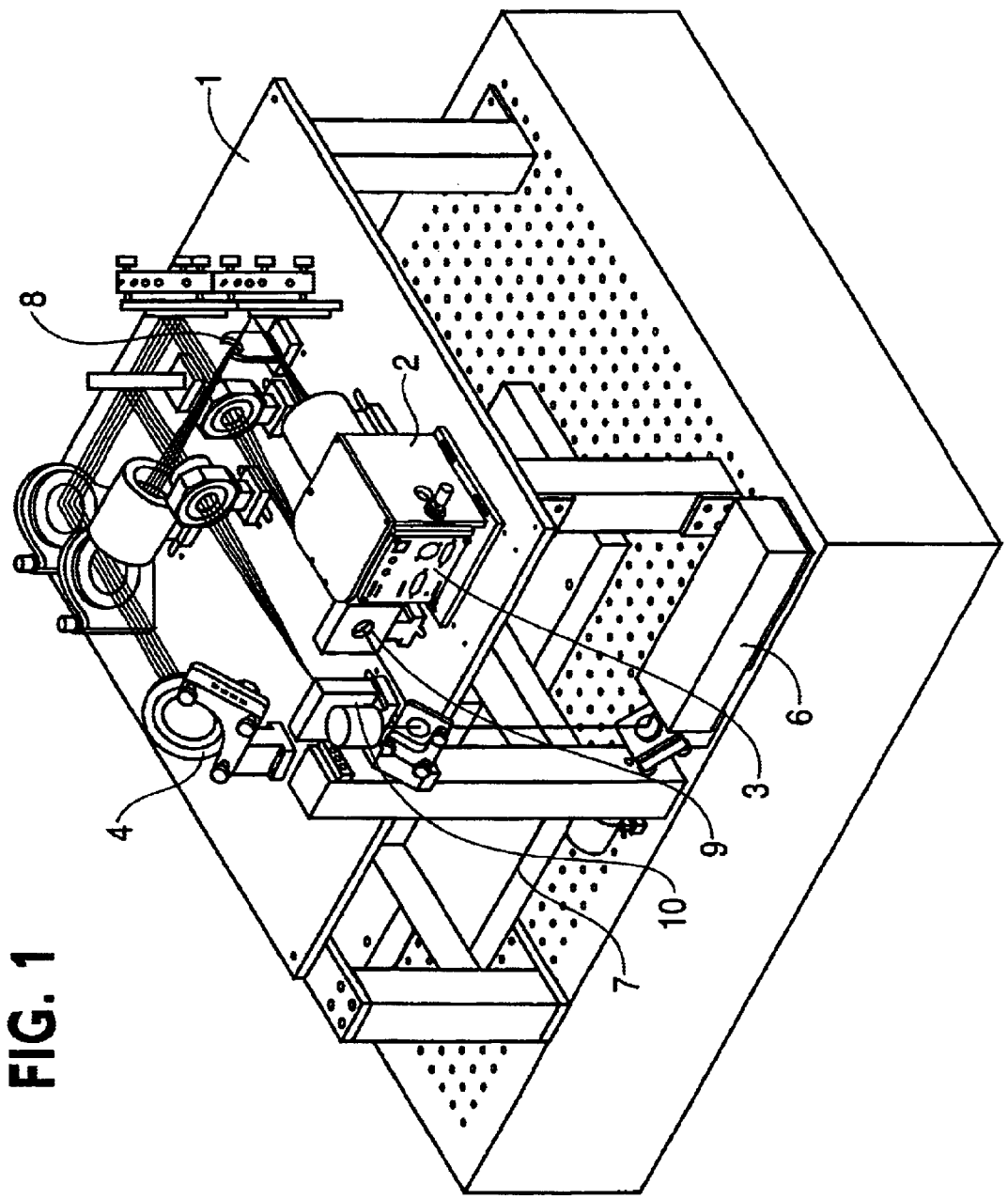
FIG. 1 is an elevational perspective view of the system of the present invention.
Figure 2:
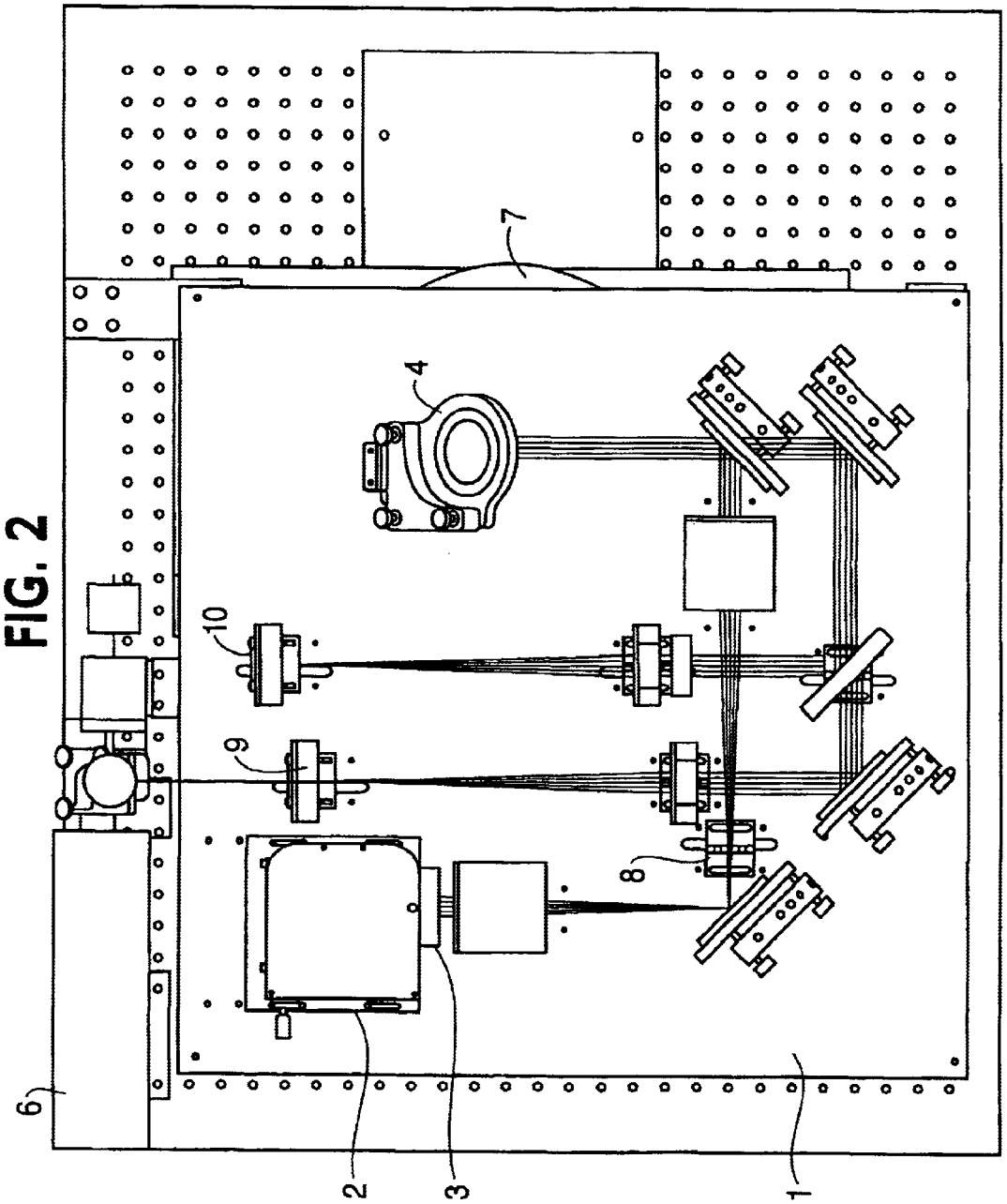
FIG. 2 is a top view of the system shown in FIG. 1.

As shown in FIGS. 1 and 2, the system includes an optical/mechanical assembly 1, a light source 6, and translation stages 7. The optical/mechanical assembly 1 includes a mounting apparatus 2, a wavefront sensor 3, an optical steering mirror 4, a dynamic range filter 8, a spatial filter 9 and a position sensor 10.

The mounting apparatus 2 controls the angular translation in two axes relative to the sensing plane of the wavefront sensor. The mounting apparatus 2 provides translation in the tip and tilt axis without creating the need to adjust the other axis. The wavefront sensor 3 reconstructs the wavefront, and is preferably a Shack-Hartmann wavefront sensor. Examples of suitable sensors are disclosed in U.S. Pat. No. 5,936,720 entitled "Beam Characterization by Wavefront Sensor", U.S. application Ser. No. 9/244,860 now U.S. Pat. No. 6,052,180 entitled "Apparatus and Method for Characterizing Pulsed Light Beams" and U.S. application Ser. No. 09/340,502 now U.S. Pat. No. 6,184,974 entitled "Apparatus and Method for Evaluating a Target Larger than a Measuring Aperture of a Sensor", all of which are hereby incorporated by reference in their entirety for all purposes. The wavefront sensor 3 may be mounted to remove tilt. When the light is in the ultraviolet range, a Lumogen coating may be provided on the wavefront sensor 3 to increase the signal return.

The dynamic range filter 8 filters out light that may create interference due to a signal which exceeds the dynamic ranged of the wavefront sensor 3. By preventing propagation of that light to the wavefront sensor 3, resulting data degradation is avoided.

The optical steering mirror 4 provides dynamic adjustment of tilt contained in the optical signal. This tilt may be induced by inaccuracies in the mechanical translation components and should not be included in the measurement. In a preferred embodiment, adjustment of the optical steering mirror includes use of piezoelectric translation devices. The position sensor 10 provides rapid feedback and control to the optical steering mirror 4 for dynamic removal of tilt.

The light source 6 may be coherent or incoherent, pulsed or continuous wave, provided by a fiber delivery/injection or propagated by other means. In the configuration shown in FIG. 1, the light source is a pulsed laser positioned below the optical/mechanical assembly 1 and is directed up to the optical/mechanical assembly 1. Power of the light source may be dynamically measured and adjusted for consistent measurements. More than one wavelength may be used for the measurement. The wavelengths are preferably in the ultraviolet range, the visible range or the infrared range. Use of shorter wavelengths may increase the accuracy of the measurements.

The spatial filter 9 is used to provide a known and controlled reference source of light when using light which is not delivered via a fiber. For example, the spatial filter 9 may be used to provide a spherical wavefront.

Translation stages 7 provide displacement of a target to be measured. A target will be placed below the optical steering mirror 4 and the optical steering mirror 4 also returns the light from the target to the wavefront sensor 3. The translation is used to locate different sectional areas of the target to be measured using the optical/mechanical assembly 1.

The translation may occur incrementally or continuously. In the configuration shown, the translation stages 7 provide controlled motion in two axes of the material or target to be examined. These stages secure the material, translate incrementally or continuously along one axis and may step along a second axis to a new zone for measurement by the first axis translation. The translation stages 7 may also allow for adjustment along the z-axis to accommodate any needed changes in focus on the target during or before measurement thereof.

Figure 3:
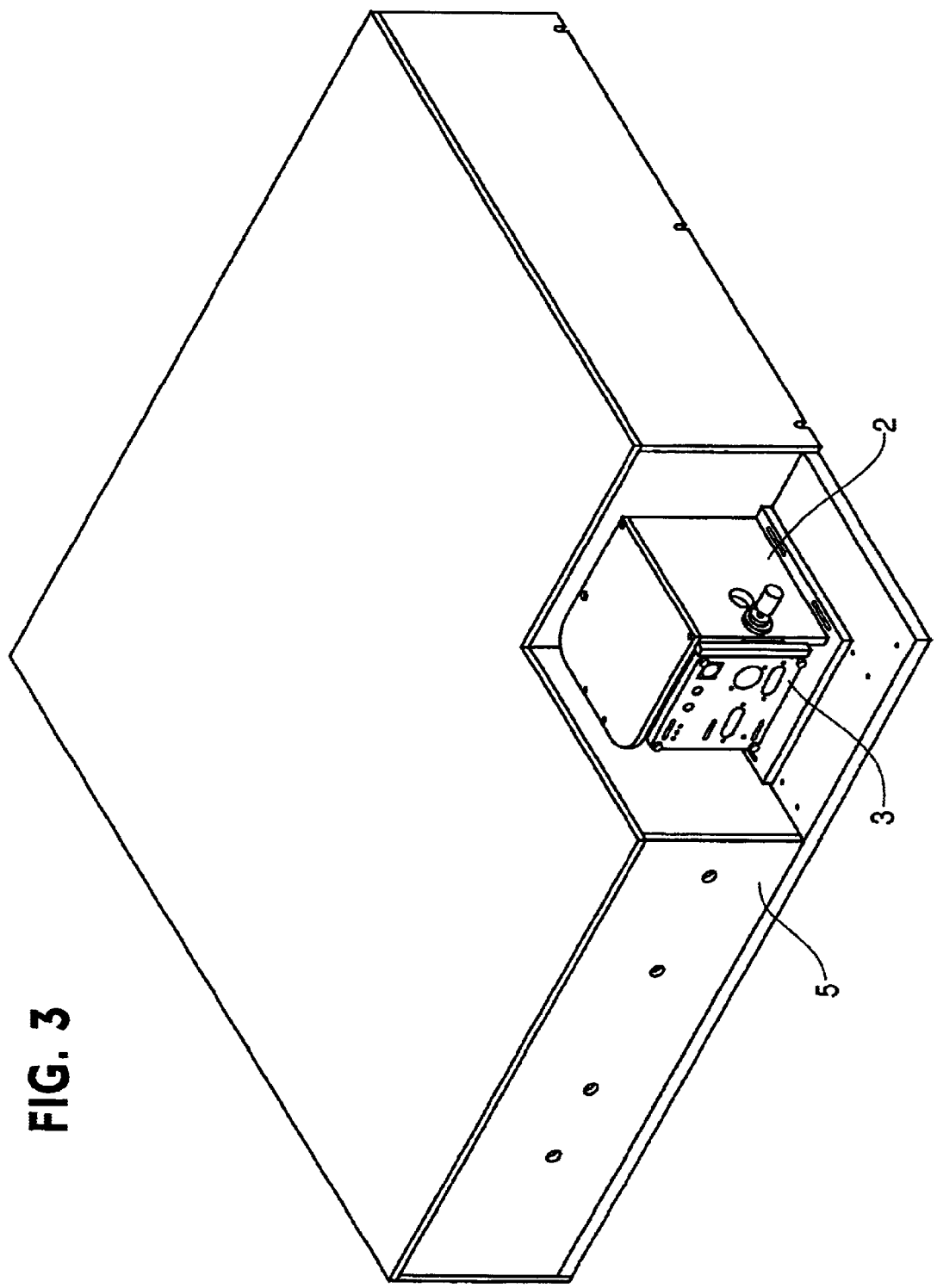
FIG. 3 is an elevational perspective view of the system of FIG. 1 with a cover thereon.
Figure 4:
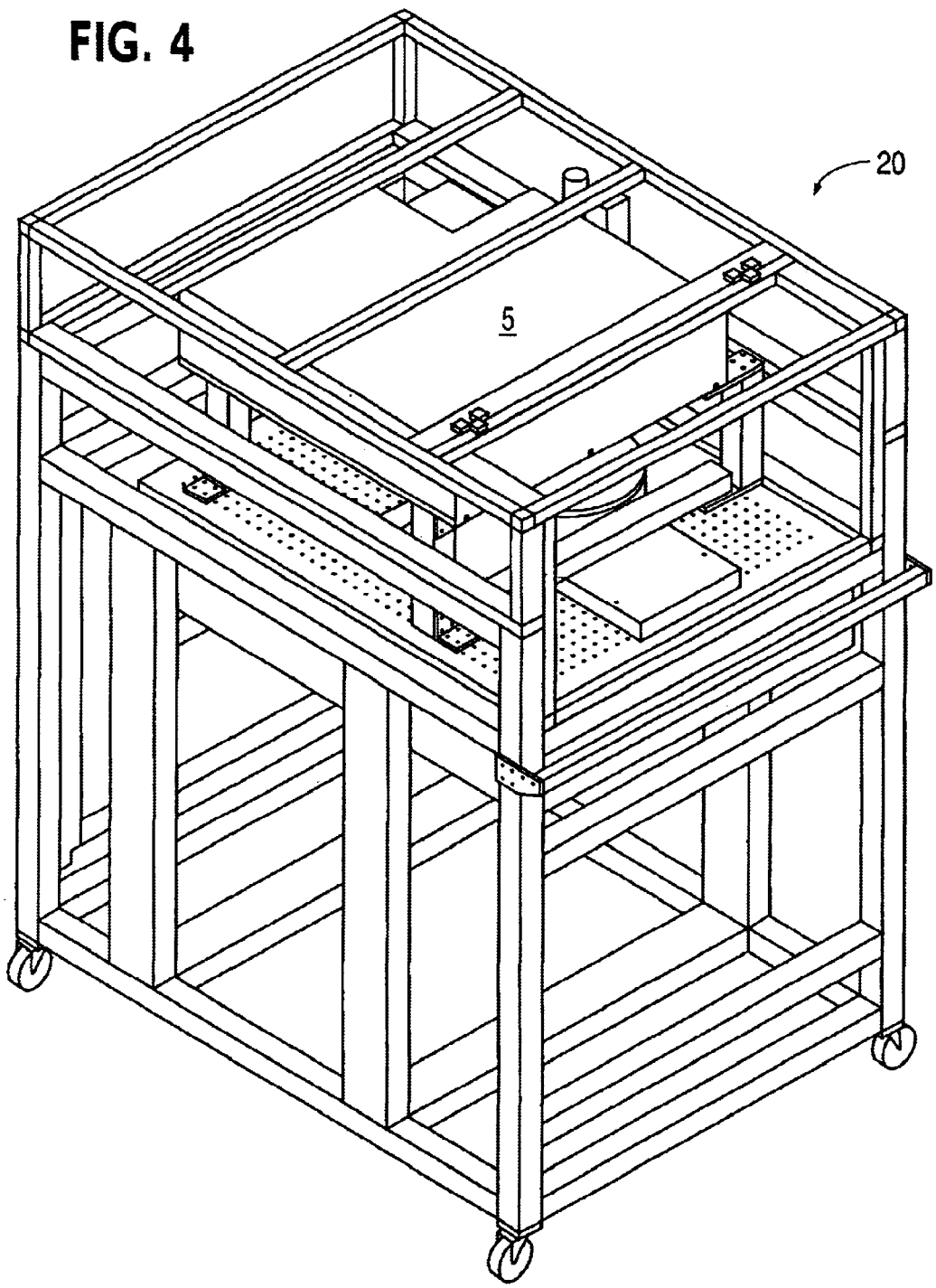
FIG. 4 is an elevational perspective view of the system of FIG. 1 mounted in a rack.

As shown in FIG. 3, the system also preferably includes an optical assembly cover 5, which prevents stray light from interfering with the optical processing assemblies and excludes potential interference of the wavefront sensor electrical and heat generation. As shown in FIG. 4, the system as shown in FIG. 3 may be provided on a rack system to facilitate movement thereof.

Figure 5A:
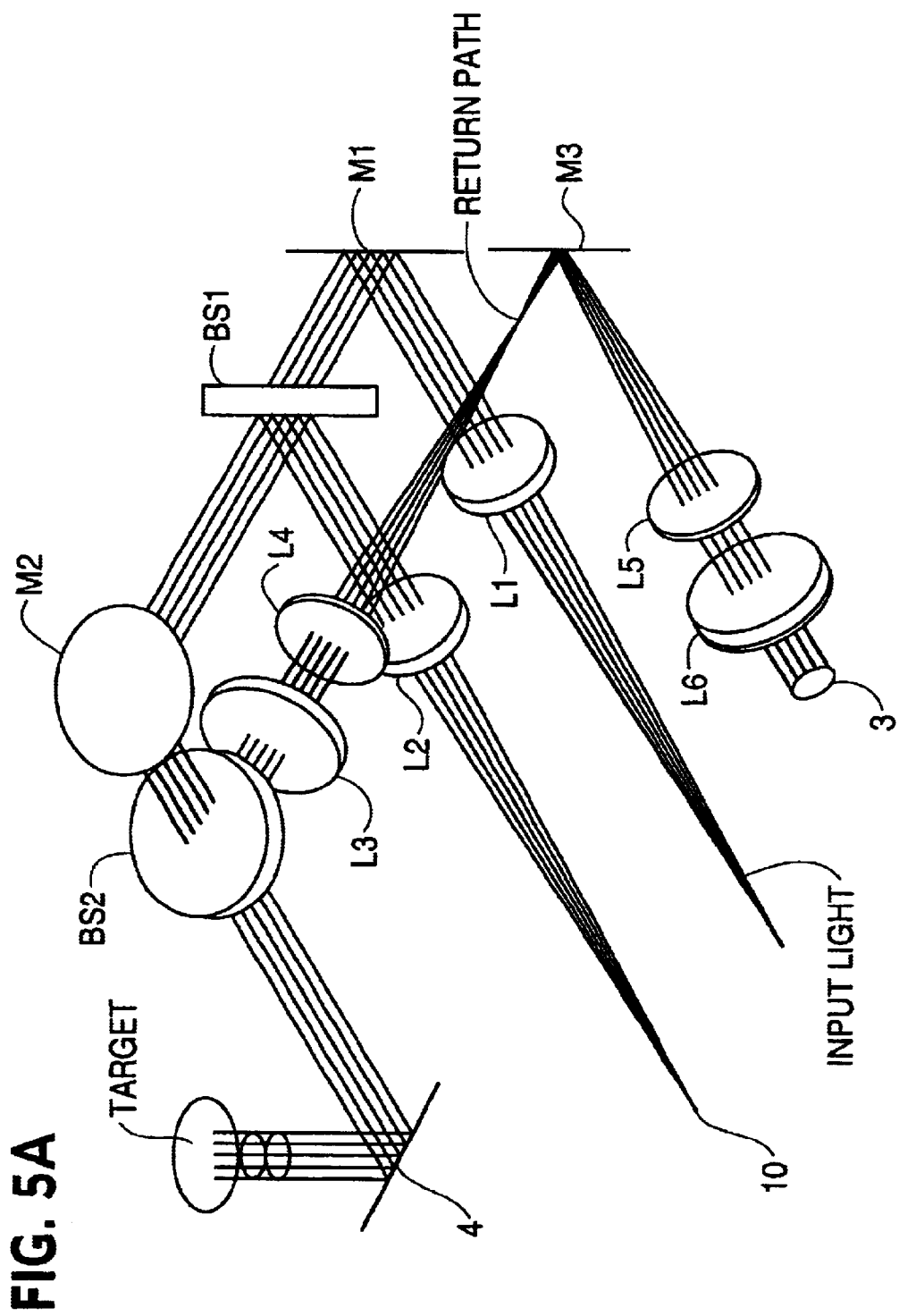
FIG. 5A is a perspective elevational schematic of the optical subsystem of FIG. 1.
Figure 5B:
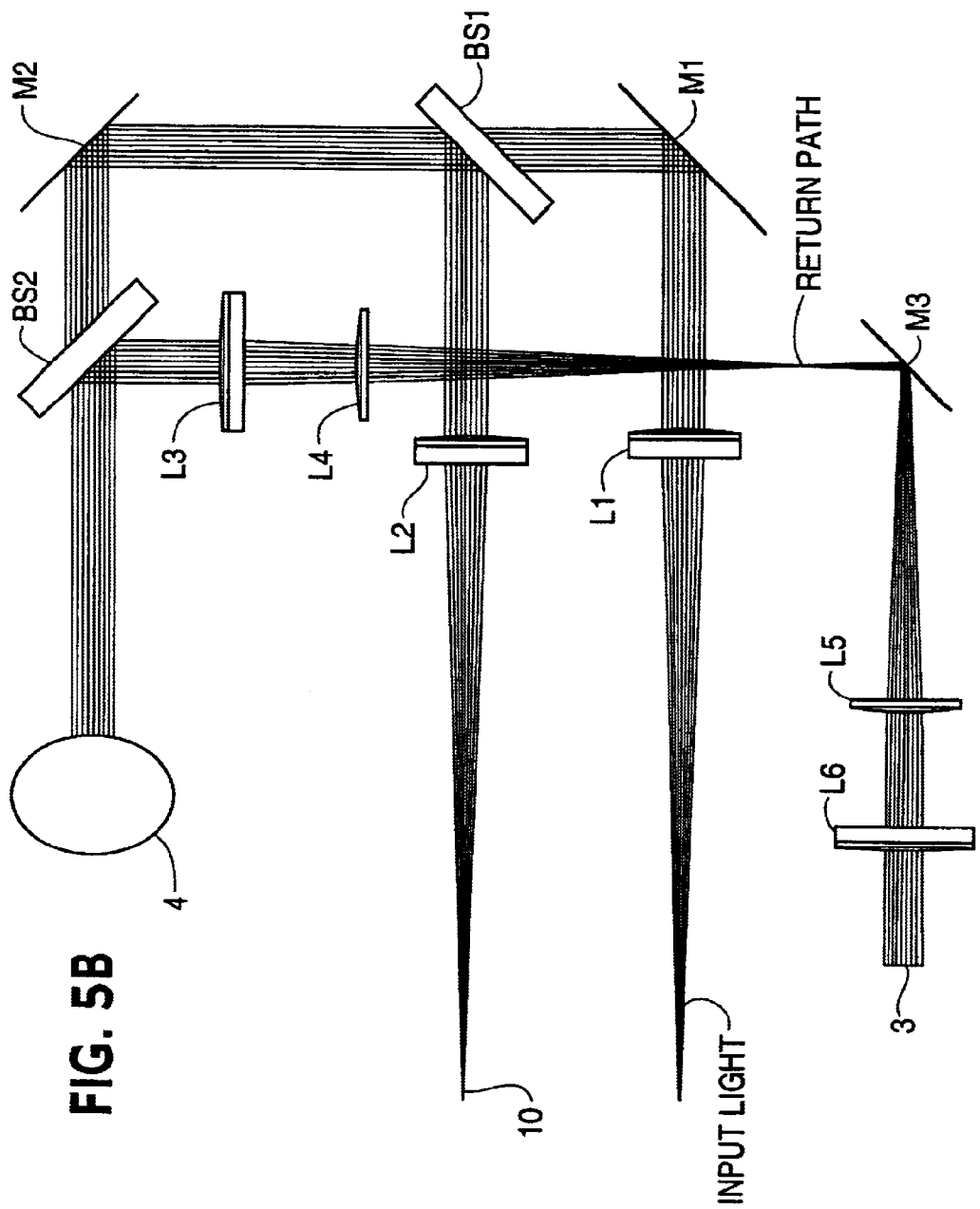
FIG. 5B is a top schematic of the optical subsystem of FIG. 1.

Details of the optical processing assembly are shown in FIGS. 5A and 5B. Input light is collimated by a lens L1. A mirror M1 directs the light to a beam splitter BS1. BS1 splits off a portion of the beam and directs it to a lens L2 which focuses the light onto the position sensor 10. The remaining light passed by BS1 is directed by a mirror M2 through a beam splitter BS2 onto the optical steering mirror 4 which directs the light onto the target. Light reflected from the target is directed by the optical steering mirror 4 back to the beam splitter BS2 where the light is now reflected onto lenses L3, L4 providing collimation and focusing to the light. A mirror M3 directs the light to lenses L6, L7 which provide the light beam from the target onto the wavefront sensor 3. Since the optical steering mirror 4 is above the target, the target cannot be seen in FIG. 5B. By using an optical table as shown in FIG. 1, the multiple optical elements may be simply aligned with one another.

Initial operation of the system includes moving a reference surface into position as the target. An image is acquired using this surface throughout the entire optical assembly, thus creating a measurement reference which includes any potential aberrations in the optical assembly. The reference measurement is then used during the dynamic data acquisition to remove any aberrations of the optical system. The reference measurement may include the acquisition of multiple frames. The ability to create this reference prior to each measurement sequence provides increased accuracy in the resulting measurements. The reference may also be introduced during the measurement cycle to increase measurement accuracy and eliminate errors due to temperature, electronic or other drift.

Then the translation stages 7 are used to provide the target to be measured in the field of view of the system. The target is then exposed to the light source and the resulting optical signal is received by the wavefront sensor 3. When using a pulsed light source, the target may be translated by one axis continuously while the light source is pulsed, thus freezing the image for the sensor. This process allows for the highest throughput as well as the ability to eliminate potential errors due to distortions caused by turbulence, vibrance, etc. Alternatively or additionally, multiple frames may be acquired of the same area to compensate for these potential distortion errors.

The wavefront sensor 3 measures the slope of the optical wavefront across the area of the target in the field of view of the system. The slope is then integrated and pieced together with its neighboring subapertures, as set forth in the above noted U.S. application Ser. No. 09/340,502, to provide the surface information associated with the target. A number of conventional processing algorithms may be used for acquiring this information and converting it into useful data. This information may be integrated with neighboring field to create a complete measurement of a large target. These algorithms may be accomplished in a number of digital and analog processes, including stitching, centroiding techniques, and look-up tables. In this example, this processing is to be performed via general purpose processors which process the data as the next measurement is being acquired. Data pipelining may also be used to increase throughput.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A metrology system comprising:

a light source;

a mechanical assembly positioning a target relative to the light source;

a wavefront sensor detecting light from the target to determine metrology of the target;

an optical assembly directing light from the light source to the target and from the target to the wavefront sensor; and a dynamic range filter disposed in an optical path between the target and the wavefront sensor.

2. The system of claim 1, wherein the wavefront sensor includes a processor performing at least one of a stitching algorithm, a centroid algorithm, look-up tables, and data pipelining.

3. The system of claim 1, wherein the optical assembly delivering light to and from the target is shielded from the wavefront sensor.

4. The system of claim 1, wherein the wavefront sensor measures wavefronts from the target at different wavelengths.

5. A metrology system comprising:

a light source;

a mechanical assembly positioning a target relative to the light source;

a wavefront sensor detecting light from the target to determine metrology of the target; and an optical assembly directing light from the light source to the target and from the target to the wavefront sensor, the optical assembly including a position sensor which detects incoming tilt from the light source, and an optical steering mirror which directs light onto the target, the position sensor controlling the optical steering mirror to dynamically remove tilt.

6. The system of claim 5, wherein the light source provides pulsed light.

7. The system of claim 5, further comprising:

a power monitor adapted to dynamically monitor and adjust a power output of the light source.

8. The system of claim 5, further comprising a dynamic range filter disposed in an optical path between the target and the wavefront sensor.

9. A metrology method comprising:

positioning a target relative to incoming light;

positioning a detector relative to the target;

directing light from the light source to the target and from the target to the detector;

detecting an incoming tilt from the incoming light;

adjusting the directing of the incoming light onto the target in accordance with the incoming tilt; and determining metrology of the target from light received by the detector.

10. The method of claim 9, wherein the light directed from the light source to the target is pulsed light.

11. The method of claim 9, further comprising dynamically monitoring and adjusting a power output of the light source.

12. The method of claim 9, spatially filtering the light from the target to the detector to insure the light remains within a dynamic range of the wavefront sensor.

* * * * *